March 7, 1950  L. W. STORM  2,499,695
JAR
Filed March 18, 1947  3 Sheets-Sheet 1

Inventor
Lynn W. Storm
By
E. V. Hardway
Attorney

March 7, 1950 L. W. STORM 2,499,695
JAR
Filed March 18, 1947 3 Sheets-Sheet 2

Inventor
Lynn W. Storm
By E. V. Hardway,
Attorney

March 7, 1950 L. W. STORM 2,499,695
JAR
Filed March 18, 1947 3 Sheets-Sheet 3

Inventor
Lynn W. Storm
By E. V. Hardway
Attorney

Patented Mar. 7, 1950

2,499,695

UNITED STATES PATENT OFFICE 2,499,695

JAR

Lynn W. Storm, Houston, Tex.

Application March 18, 1947, Serial No. 735,398

3 Claims. (Cl. 255—27)

This invention relates to a jar.

In carrying on well drilling operations tools, or pipe, often become stuck in the well bore and must be removed. At times in carrying on this work, it is desirable to employ a special tool, commonly known as a jar, whereby a blow, or blows, may be delivered to the stuck object thus eventually jarring the same loose.

A common type of jar now in use is what is known as the mechanical torque type which, in order to operate, must be subjected to considerable torque. This act of imparting torque often presents a considerable hazard and requires additional rigging. Due to friction of surface equipment under high torsional stress the pull to which the stuck object is subjected cannot be accurately ascertained. Therefore, a type of straight pull jar is preferable to the torque type.

Hydraulic jars are also in use but some of these are limited as to their effectiveness in striking a blow by the available hydrostatic pressure of the fluid in which they operate.

Other types utilizing hydraulically actuated means are confined in operation to one direction, only, that is to an upstroke or a downstroke. There are also other types of hydraulically actuated jars but they are limited in either their direction of action or in the absence of provision for controlling the intensity of the stroke delivered.

Therefore, it is an object of the present invention to provide a jar of the character described which is of the straight pull type, which can jar either up or down and which can be controlled in operation to deliver blows of varying intensity.

In one form of the invention provision is also made to limit the intensity of the pressure to which the liquid in the barrel may be subjected.

Other objects and advantages will be apparent from the following specification which is illustrated by the accompanying drawings, wherein—

Figure 1:
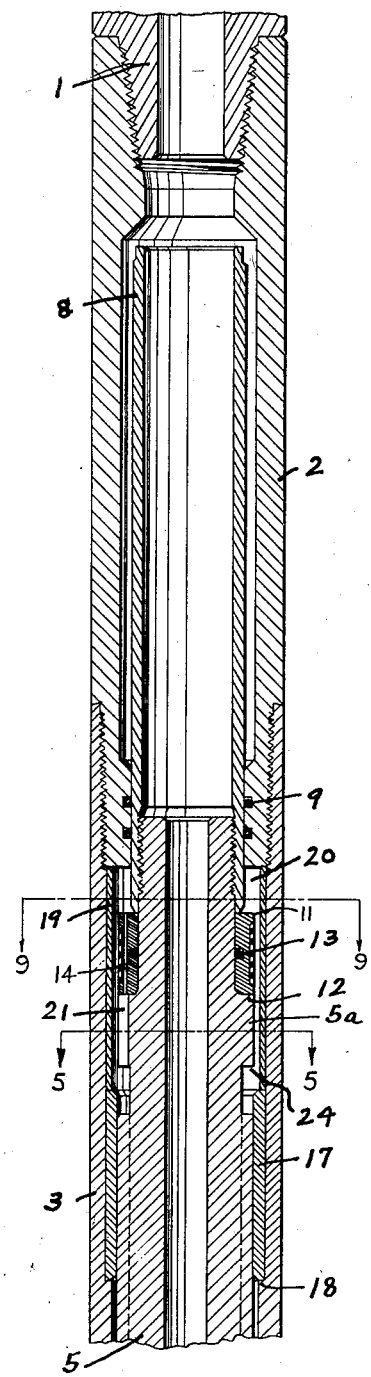
Figure 1 is a longitudinal, sectional view of the upper end of the jar.
Figure 2:
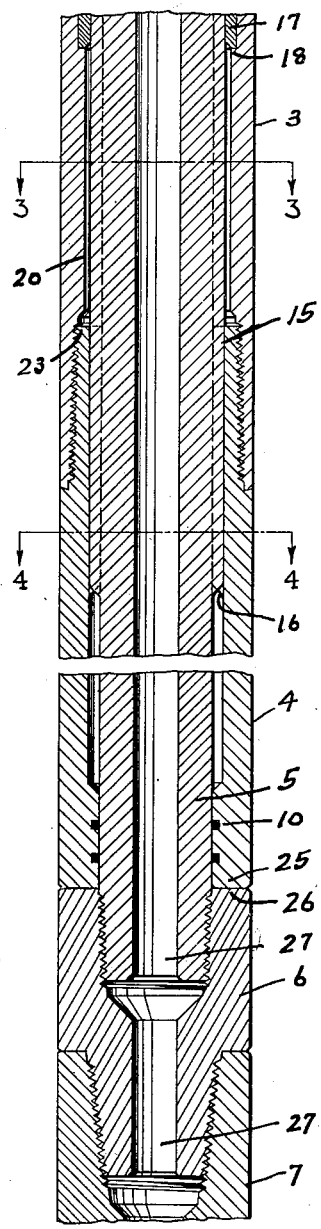
Figure 2 is a longitudinal, sectional view of the lower end thereof.
Figure 3:
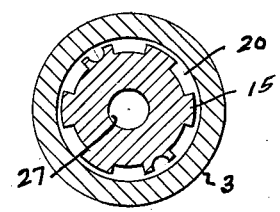
Figure 3 is a cross-sectional view taken on the line 3—3 of Figure 2.
Figure 4:
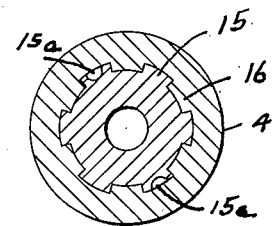
Figure 4 is a cross-sectional view taken on the line 4—4 of Figure 2.

Referring now more particularly to the drawings wherein like numerals of reference designate the same parts in each of the figures, the numeral 1 designates a string of drill pipe having a pin at its lower end which may be threaded into the upper end of a tubular barrel 2. Connected to the lower end of the barrel there is a tubular body preferably formed of upper and lower sections 3 and 4.

Working axially through the body there is a tubular piston stem 5 and its lower end is threaded into a tubular coupling 6 to which any suitable type of grapple 7 may be attached.

The piston stem extends up through the barrel and threaded onto its upper end there is a wash pipe 8 which extends up into the barrel 2.

This piston stem 5 and wash pipe 8 move as a unit which is sealed with the lower end of the barrel 2 by the annular seal rings 9 between them and with the lower end of the body by means of the seal rings 10 between them.

Figure 5:
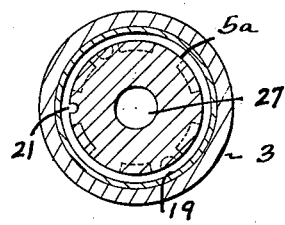
Figure 5 is a cross-sectional view taken on the line 5—5 of Figure 1.

The upper end of the piston stem 5 is enlarged in external diameter, as shown in Figure 5, forming a piston head 5a and mounted on said head, beneath the lower end of the wash pipe 8 there is a piston 11. This piston 11 is preferably formed of replaceable packing material and is seated on a shoulder 12 of the piston head and is clamped thereon by the lower end of the wash pipe 8. It is preferably provided with an inside O-ring type packing 13 to prevent leakage between it and the piston head.

This piston is provided with a restricted duct 14 leading from the upper to the lower end thereof.

Spaced beneath the head 5a the piston stem 5 is provided with external longitudinal ribs, or splines, 15 spaced apart therearound which intermesh with similar internal longitudinal ribs, or splines, 16 in the upper end of the lower body section 4. These splines allow relative longitudinal movement between the piston stem and body but prevent their relative rotation.

Within the upper body section 3 there is a replaceable cylinder 17 whose lower end is seated on an inside annular shoulder 18 in the body section 3. This cylinder is held in position by means of a sleeve-like retainer 19 which is fitted into the upper body section 3, whose lower end abuts the upper end of the cylinder 17 and whose upper end abuts the lower end of the barrel 2.

The piston 11 is of an outside diameter to fit snugly within the cylinder 17 as it passes therethrough but, it is to be noted that the inside diameter of the cylinder 17 is somewhat less than the corresponding inside diameter of the body of the tool. Therefore, when the piston 11 is either above or beneath the cylinder 17 there will be a continuous cylindrical chamber 20 above and beneath the cylinder 17 within the body which is completely filled with a suitable fluid such as heavy oil.

Obviously any attempt to force the piston through the cylinder 17 in either direction will be opposed by the liquid, which is substantially non-compressible. Therefore, to allow movement of the piston through the cylinder the duct 14 has been provided whose lower end emerges into a longitudinal groove 21 in the piston stem head. This duct may be made of a capacity to suit varying requirements.

Figure 8:
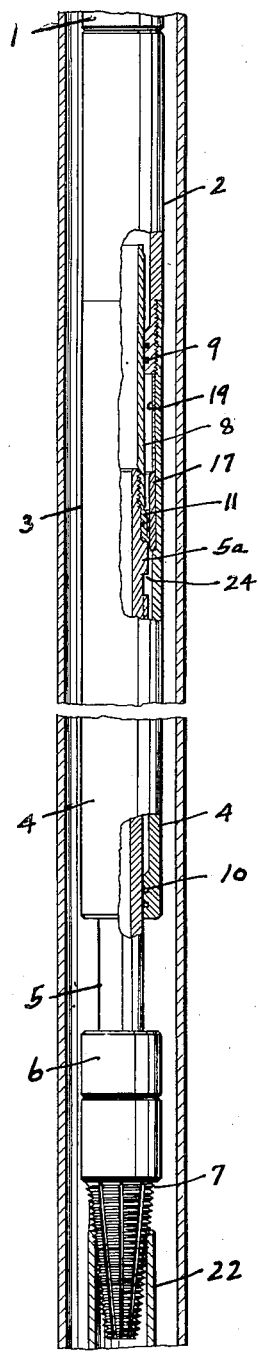
Figure 8 is a side elevation of the complete tool, partly in section, showing the parts in an intermediate position between strokes.

In operation the tool may be assembled, as shown in Figure 8, and lowered into the well bore until the grapple is in position to engage the stuck pipe 22 to be pulled.

In the present illustration the grapple is shown as a tapered tap which may be screwed into the stuck object by rotation of the tool. As illustrated in this Figure 8 the tool is in position for jarring upwardly and the drill pipe is shown as being raised and the cylinder 17 is shown passing over the piston 11. As the cylinder 17 moves over said piston the fluid in that portion of the cylindrical chamber 20 beneath the piston will be subjected to pressure and since this fluid is substantially non-compressible no relative travel results between the cylinder and piston except that provided by the transfer of fluid from the lower to the upper side of the piston through the duct 14. A certain period of time depending on the pressure created will be required, therefore, for the cylinder 17 to move over the piston and this length of time is known to the operator. During this time interval the operator places a pre-determined tension on the string of pipe 1 thus imparting a stretch to the pipe and holds the pipe under this tension until the necessary fluid exchange due to pressure differential takes place.

Figure 6:
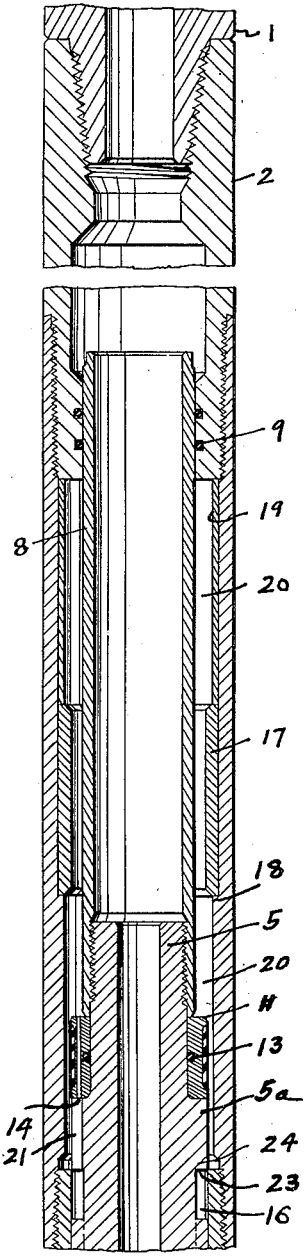
Figure 6 is a longitudinal, sectional view of the upper end of the tool upon completion of the upstroke.
Figure 7:
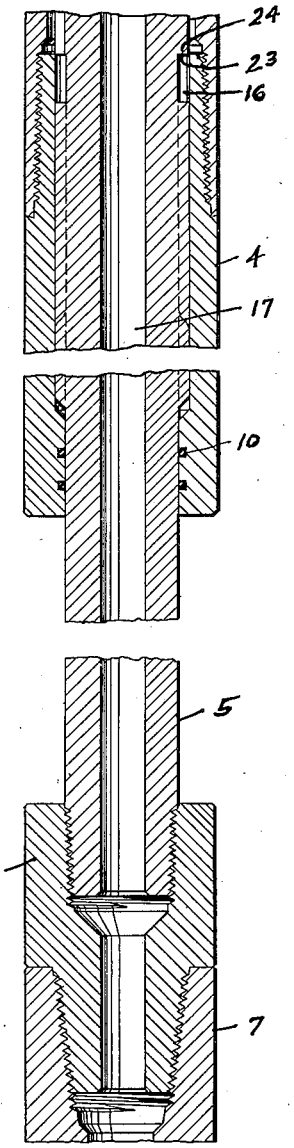
Figure 7 is a longitudinal, sectional view of the lower end thereof.

At the instant the cylinder 17 moves completely off of the piston the compressive, or restraining, force is lost and the stretched pipe rebounds thus causing the upper ends 23 of the splines 16 of the lower body section 4 to strike the lower end 24 of the piston head, as shown in Figures 6 and 7, thus imparting a violent blow which is transmitted through the piston stem 5 to the stuck pipe 22.

The tool is then in a position to strike downwardly if it be desired to do so. Since the piston is now below the cylinder 17 the operator may simply slack off as much weight as he desires and the process of compression and bleed-off above described is repeated, only the compression and travel of fluid is reversed in relation to the piston and cylinder, in other words the cylinder moves downwardly over the piston and the fluid in the cylindrical chamber 20 above the piston is placed under compression until the piston clears the cylinder, and upon the downward movement of the body of the tool, relative to the anchored portion of the tool the lower end 25 of the body of the tool strikes a blow against the upper end 26 of the coupling 6 which is transferred directly through the grappling tool 7 to the stuck pipe.

It is to be here noted that the displacement of the wash pipe 8 and stem 5 are so proportioned that the fluid system is balanced above and beneath the cylinder 17. Thus the fluid is merely transferred from one side of the piston to the other in the complete cycle.

Some of the ribs 15 have longitudinal passageways 15a to allow the free passage of liquid during the operation of the tool.

The force of either the up or down stroke may be increased or decreased at will by merely regulating the tension on the pipe in a given time interval for up stroke and by regulating the weight of pipe imposed in preparation for the down stroke.

It is also to be noted that the operator may jar only upwardly or only downwardly if he so desires.

If it is not desired to make an up stroke only sufficient tension may be taken on the pipe to cause the fluid to leak through from below to above the piston without a reserve supply of tension on the pipe to cause sufficient stretch to cause a stroke and similarly in slacking off only a sufficient weight may be provided to cause a transfer of liquid from above the cylinder to the chamber beneath thus avoiding the creation of excessive pressures to the fluid which would cause an accumulation of stretch, or load, on the pipe.

The hydraulic action described is entirely independent of hydrostatic pressures existing in the well fluid.

It is further to be noted that circulation may be maintained through the tool at all times as provided by the tubular wash pipe and the bore 27 which leads through the piston stem, the coupling 6 and the grapple 7.

It is obvious that the duct 14 may be dispensed with by leaving a slight clearance between the piston 11 and the clyinder 17, the cross-sectional area of said clearance being approximately the same as the cross-sectional area of the duct 14 and the same results thus obtained.

Figure 9:
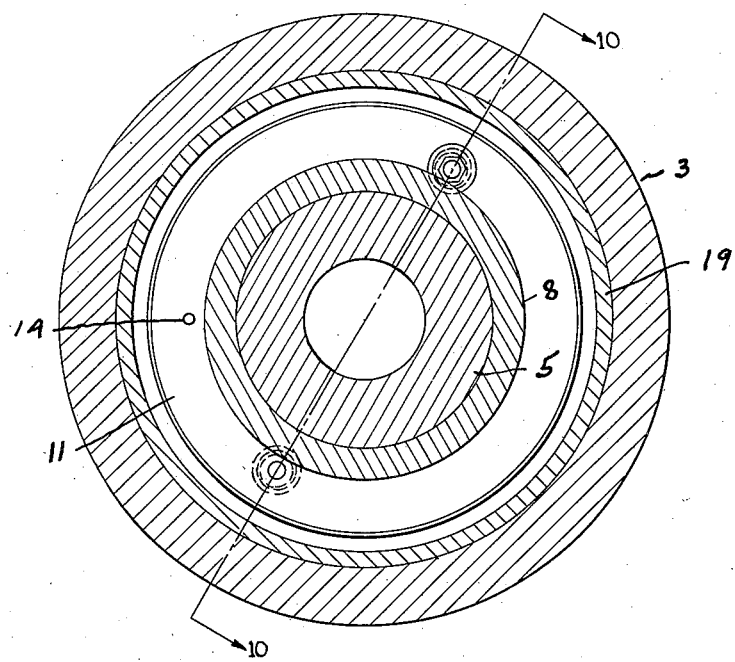
Figure 9 is an enlarged transverse, sectional view, taken on the line 9—9 of Figure 1 showing another embodiment of the invention
Figure 10:
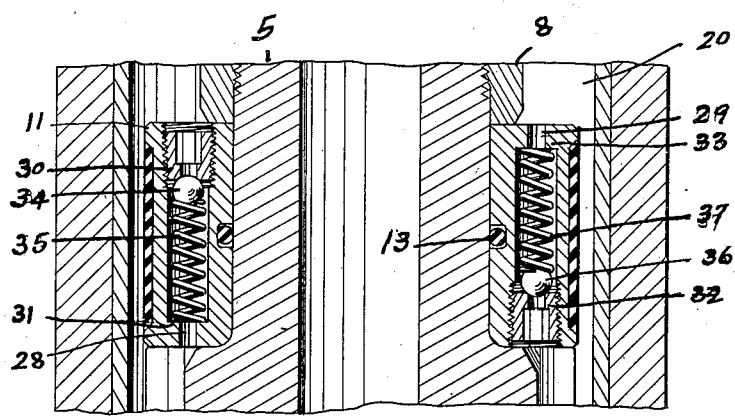
Figure 10 is an enlarged fragmentary sectional view, taken on the line 10—10 of Figure 9.

In Figures 9 and 10 another embodiment of the piston 11 is shown. In this embodiment two ducts 28 and 29 are provided leading longitudinally through the piston. The duct 28 is provided with a valve seat 30 at its upper end and an inside annular shoulder 31 at its lower end. The duct 29 is provided with a valve seat 32 at its lower end and an inside annular shoulder 33 at its upper end.

The seat 30 is controlled by a downwardly opening valve 34 which is normally maintained closed by a coil spring 35 which is seated on the shoulder 31.

The seat 32 is controlled by a valve 36 which is normally held closed by a coil spring 37 which is seated against the inside shoulder 33.

Normally the springs 35 and 37 are of sufficient strength to hold the corresponding valves closed during the normal operation of the tool, allowing only a sufficient amount of liquid to pass to permit the piston to move through the cylinder; or the valves may be held completely closed provided there is a sufficient clearance left between the piston and cylinder to allow the piston to gradually move through the cylinder. However, if a sudden unusual strain were taken to make an up stroke, without the release valve 36, the pressure on the liquid beneath the piston might become sufficiently high to burst the barrel but in such case with said valve the spring 37 is only of such strength as to withstand a normal safe pressure and in case of excessive pressure the valve 36 would open to relieve the excess pressure; or in making a down stroke if the string of pipe is suddenly and inadvertently released, without the valve 34 the liquid in the chamber 20 above would be subjected to an abnormally high pressure; but with the valve 34 the pressure will be relieved thus preventing injury to the tool.

In some cases it may be desired to make only up strokes and in such case the spring 35 is made weak so that when the operating string is moved downwardly the liquid above the piston may readily pass down beneath it without any substantial resistance being offered to the piston, and vice versa.

The drawings and description are illustrative merely while the broad principle of the invention will be defined by the appended claims.

What I claim is:

1. A well tool comprising inner and outer telescopically arranged tubular parts movable longitudinally relative to each other, means for connecting said outer part to an operating string, means for connecting said inner part to an object stuck in a well bore, an annular fluid chamber formed between the inner tubular part and the outer tubular part, a piston on the inner tubular part, sealing means at the ends of said chamber, said chamber having a restricted internal diameter intermediate its ends forming a cylinder coacting with said piston to permit of the latter moving through and beyond said cylinder in either direction upon relative longitudinal movement of said inner and outer parts, said cylinder and piston coacting to permit of fluid flow from one side of said piston to the other side thereof as the piston moves through the cylinder, said sealed ends of said chamber being of substantially the same diameter to provide uniform chamber volume regardless of the relative positions of said inner and outer parts, and coacting impact faces on the inner and outer parts arranged to contact when the parts reach the limit of their movement relative to each other in either direction.

2. A well tool comprising inner and outer telescopically arranged tubular parts movable longitudinally relative to each other, means for connecting said outer part to an operating string, means for connecting said inner part to an object stuck in a well bore, an annular fluid chamber formed between the inner tubular part and the outer tubular part, a piston on the inner tubular part, a duct in said piston leading from the upper to the lower end thereof, sealing means at the ends of said chamber, said chamber having a restricted internal diameter intermediate its ends forming a cylinder coacting with said piston to permit of the latter moving through and beyond said cylinder in either direction upon relative longitudinal movement of said inner and outer parts, said cylinder and piston coacting to permit of fluid flow through said duct from one side of said piston to the other side thereof as the piston moves through the cylinder, said sealed ends of said chamber being of substantially the same diameter to provide uniform chamber volume regardless of the relative positions of said inner and outer parts, and coacting impact faces on the inner and outer parts arranged to contact when the parts reach the limit of their movement relative to each other in either direction.

3. A well tool comprising inner and outer telescopically arranged tubular parts movable longitudinally relative to each other, means for connecting said outer part to an operating string, means for connecting said inner part to an object stuck in a well bore, an annular fluid chamber formed between the inner tubular part and the outer tubular part, a piston on the inner tubular part, sealing means at the ends of said chamber, said chamber having a restricted internal diameter intermediate its ends forming a cylinder coacting with said piston to permit of the latter moving through and beyond said cylinder in either direction upon relative longitudinal movement of said inner and outer parts, the annulus of said piston being spaced from said cylinder to permit of fluid flow around said piston from one side to the other side thereof as the piston moves through the cylinder, said sealed ends of said chamber being of substantially the same diameter to provide uniform chamber volume regardless of the relative positions of said inner and outer parts, and coacting impact faces on the inner and outer parts arranged to contact when the parts reach the limit of their movement relative to each other in either direction.

LYNN W. STORM.

REFERENCES CITED

The following references are of record in the file of this patent:

UNITED STATES PATENTS

| Number | Name | Date |
|---|---|---|
| 1,401,111 | Sigel | Dec. 20, 1921 |
| 1,578,148 | Lissen | Mar. 23, 1926 |
| 1,584,884 | Merrick | May 18, 1926 |
| 1,637,505 | Wigle | Aug. 2, 1927 |
| 1,804,700 | Maxwell | May 12, 1931 |
| 2,029,579 | McCullough | Feb. 4, 1936 |
| 2,172,480 | Osmun | Sept. 12, 1939 |
| 2,309,872 | Shaffer et al. | Feb. 2, 1943 |
| 2,474,459 | Beck | June 28, 1949 |